United States Patent Office 3,113,869
Patented Dec. 10, 1963

3,113,869
PROCESS FOR PREPARING AN ALIMENTARY PASTE AND THE RESULTING PRODUCT
Louis J. Lee, Rochester, N.Y., assignor to Eastman Kodak Company, Rochester, N.Y., a corporation of New Jersey
No Drawing. Filed Jan. 16, 1961, Ser. No. 82,729
18 Claims. (Cl. 99—85)

This invention relates to foods. More particularly, it relates to alimentary paste products.

Alimentary paste products, such as, for example, spaghetti, macaroni, noodles and various other specialty items, are well known articles of commerce. They are prepared by forming a paste of flour and water, sometimes with eggs (as in noodles), extruding the paste or dough under very high pressure into the desired product shape and then carefully drying under controlled humidity conditions. Generally the flour used in forming the paste is a high quality, milled, durum wheat known as semolina. Occasionally the flour may also comprise less costly farina.

When alimentary paste products are prepared for use, they are cooked in boiling water and usually, depending on the ultimate use, allowed to cool or kept warm. It is well known that after being cooked such products become pasty, sticky or even slimy. Rinsing the cooked alimentary paste product in cool water helps to minimize this condition. This is unsatisfactory, however, because it usually results in the alimentary paste product being served cold and it still does not completely eliminate the pasty, sticky or slimy condition.

Precooked foods (such as canned spaghetti and frozen spaghetti) are usually cooked in an excess of water, packaged or canned and then heated for an hour at 200° F. This overcooking softens the product and in the case where an alimentary paste product is present results in a sticky mass in the package or can. In this case, in addition to being aesthetically undesirable, stickiness degrades the product, making it less acceptable. In some instances where canned precooked spaghetti is involved gluten may be included in the alimentary paste in order to strengthen the spaghetti. This, however, does not eliminate the stickiness problem.

An object of this invention is to provide improved alimentary paste products which do not become pasty, sticky or slimy upon cooking and which are not degraded even after substantial overcooking.

Another object of this invention is to provide a process for preparing alimentary paste products which do not become pasty, sticky or slimy upon cooking and which are not degraded even after substantial overcooking.

These and other objects which may appear as this specification proceeds are achieved by this invention.

In summary this invention comprises an alimentary paste product which comprises an edible, chemically saturated monoglyceride. Moreover, this invention comprises a process for preparing an alimentary paste product which comprises contacting the alimentary paste flour with an edible, chemically saturated monoglyceride.

Edible, chemically saturated monoglycerides are the fatty acid monoesters of glycerol, wherein the fatty acid moieties are chemically saturated and preferably comprise from about 8 to about 22 carbon atoms and commonly 14 to 20 carbon atoms. Fatty acid moieties having less than 8 carbon atoms can be used but the effectiveness of the corresponding monoglycerides is not adequate at practical concentrations. A greater number than 22 carbon atoms could be employed but since fatty acids of greater than 22 carbon atoms and corresponding glycerides are not available on a commercial scale, 22 carbon atoms is a practical upper limit.

The monoglycerides of this invention can be prepared in accordance with well known procedures by direct esterification of saturated fatty acids with glycerine followed preferably by distillation to obtain a high purity monoglycerides mixture. The monoglycerides of this invention can also be prepared by the glycerolysis of chemically saturated vegetable and animal oils, that is, the interesterification of glycerine with chemically saturated triglycerides, such as those provided by hydrogenated lard, hydrogenated beef tallow, hydrogenated soybean oil, hydrogenated cottonseed oil and the like. Preferably the resulting interesterification reaction mixture is thereafter subjected to thin film, vacuum distillation to distill off a high purity mixture of monoglycerides. This preparation of distilled, high purity monoglyceride compositions is disclosed by Kuhrt in U.S. Patents Nos. 2,634,234, 2,634,278, and 2,634,279. Such distilled monoglyceride compositions usually contain monoglycerides at a concentration of at least 90% by weight. Moreover, the high purity monoglyceride compositions of commerce are usually solid at room temperature.

The total monoglycerides concentration in the alimentary paste product of this invention is in a range from about 0.3 to about 2 percent by weight of the flour content (considered in the as-obtained or as-added condition). A concentration less than about 0.3 weight percent is possible but the effect of the monoglycerides is insignificant. A concentration greater than about 2 weight percent is also possible but not practical due to the increased difficulty in extruding the resulting alimentary paste and the fact that the increase in effect on the end product over the effect at about the 2 weight percent level is not of sufficient magnitude to justify from a practical point of view the increase in concentration. Usually the concentration is in a range from about 0.5 to about 1.2 percent by weight of the flour content.

The alimentary paste products of this invention are prepared by contacting the flour component with an edible, chemically saturated monoglyceride composition at any stage following the formation of the flour up to and including the point of formation of the alimentary paste product. This contacting may be accomplished in a number of ways.

For instance, the monoglyceride composition can be added as a dispersion in water to the flour during the blending and kneading of the alimentary paste ingredients and before extrusion of the alimentary paste into the desired shape. The monoglyceride dispersion may be prepared by adding the monoglyceride composition with stirring to water heated to and maintained at a temperature of about 140°–150° F. until a homogeneous emulsion is obtained. Citric acid or the like may be added as a buffering agent to control the emulsion viscosity when water employed in making the dispersion is slightly alkaline.

The monoglyceride composition can also be added as a dry powder or dry free flowing beads to the flour at the flour mill or at the blender before the kneading operation when the kneading and the heat generated by the worm gear to the extruder does an adequate job of melting the monoglycerides, whereby contacting occurs, and of uniformly incorporating the monoglycerides into the finished product.

Various concepts and features of advantage of this invention are demonstrated by the following examples. In this regard these examples are presented for purposes of illustration and not of restriction.

*Example 1*

This example illustrates the improvement obtained when applying the basic concepts of this invention to noodles.

Three laboratory size batches of noodle paste were prepared by mixing together water and semolina. In one batch there was incorporated at the time of mixing an edible, chemically saturated monoglyceride composition marketed as Myverol Distilled Monoglycerides Type 18-07 at a concentration equal to 1 percent of the weight of the semolina in the batch. In a second batch there was incorporated at the time of mixing a quantity of Myverol Distilled Monoglycerides Type 18-07 product at a concentration equal to 3 percent of the weight of the semolina in this batch. The third batch did not contain any monoglycerides and was considered as a control. However, all three batches had the same semolina and water concentrations.

The Myverol Distilled Monoglycerides Type 18-07 product is a distilled monoglyceride composition derived by the aforementioned interesterification-distillation procedure from glycerine and hydrogenated cottonseed oil. This commercial product contains a mixture of monoglycerides at a concentration of at least about 90 weight percent with the fatty acid moieties being chiefly those of stearic acid and palmitic acid.

The monoglyceride composition in each case was added to the corresponding mix as an aqueous dispersion. The dispersion was formed in each case by adding with stirring the selected quantity of monoglyceride composition to water heated and maintained at a temperature in the range of 140° F. to 150° F. until a homogeneous emulsion was obtained.

Each batch of noodle paste was passed between hand operated metal rollers and pressed into sheets of approximately 1/16 inch thickness. The sheets were cut into ribbons and dried at room temperature and humidity for 36 hours.

Samples of each batch of noodle paste ribbons were cooked for 10 minutes in boiling water. The cooked sample of the control batch appeared elastic and pasty. The cooked sample of the 1% monoglycerides batch was less elastic and less pasty to the touch than the cooked sample of the control batch. The cooked sample of the 3% monoglyceride batch was drier in appearance, less elastic than the cooked sample of the control batch and less pasty than the cooked samples of both the control batch and 1% monoglycerides batch.

*Example 2*

This example illustrates the improvement obtained when applying the basic concepts of this invention to spaghetti.

1710 pounds of water were heated to 150° F. in a mixing tank. To this water were added with stirring 54 pounds of Myverol Distilled Monoglycerides Type 18-07. This dropped the water temperature to about 142° F. and resulted in a slightly viscous homogeneous dispersion.

This dispersion was metered into a ribbon blender at a rate to give a total monoglycerides concentration of about 0.8 percent of the flour content in the finished spaghetti after extrusion, cutting, and drying. Also metered into the ribbon blender was enough #1 semolina wheat flour to provide a total monoglycerides-semolina blend of 6,800 pounds. The blend was extruded through a production type spaghetti extruder to form strands or filaments. Then, the strands or filaments were cut and dried by normal procedures.

A sample of the resulting product was cooked for 12 minutes. Without rinsing the cooked sample in cold water, the sample was found to be non-pasty. By contrast a control sample of spaghetti without monoglycerides when cooked for 12 minutes was pasty and clumped together at the end of 11 minutes. After cooking for 28 minutes it was found that the sample of the improved spaghetti product of this invention did not have the heretofore customary pasty quality or softness and remained separated after standing for some time.

Thus, under the concepts of this invention alimentary paste products of improved properties are obtained. Pastiness and sticking long so common in these products even when made from highest grade flours is now practically eliminated. As a result, and this is of particular advantage to institutions, it is now practical to prepare in advance large quantities of macaroni, spaghetti, or noodles, for example and to hold them until ready to serve, reheating if necessary without encountering the usual stickiness and clumping together. Frozen spaghetti and macaroni can now be prepared for eating without being sticky and lump. Canned macaroni and spaghetti can now be prepared without obtaining solid masses in cans, that settle and stick together.

It is probable that the basic principle of this invention is that edible, chemically saturated monoglycerides form complexes with soluble amylose in the flour, which otherwise is liberated in the presence of water at elevated temperatures and becomes gelatinous and sticky.

In this regard these effects and advantages are realized only with edible, chemically saturated monoglycerides and not with diglycerides and triglycerides.

Other embodiments, advantages and features of this invention will be apparent to those in the exercise of ordinary skill in the art upon reading the foregoing specification. In this regard, all embodiments of this invention including variations and modifications thereof embracing the spirit and essential characteristics thereof are within the scope of the claimed subject matter unless expressly excluded by claim language.

I claim:

1. An alimentary paste product comprising an edible, chemically saturated monoglyceride at a concentration of at least about 0.3 percent by weight of the flour content of said product.

2. An alimentary paste product comprising an edible, chemically saturated monoglyceride composition at a concentration in a range from about 0.3 to about 2 percent by weight of the flour content of said product.

3. An alimentary paste product comprising an edible, chemically saturated monoglyceride composition at a concentration in a range from about 0.3 to about 2 percent by weight of the flour content of said product, at least about 90 percent by weight of said monoglyceride composition consisting of edible, chemically saturated monoglycerides in which the fatty acid moieties have from 8 to 22 carbon atoms.

4. An alimentary paste product comprising an edible, chemically saturated monoglyceride composition at a concentration in a range from about 0.5 to about 1.2 percent by weight of the flour content of said product, at least about 90 percent by weight of said monoglyceride composition consisting of edible, chemically saturated monoglycerides in which the fatty acid moieties have from 14 to 20 carbon atoms.

5. A noodle product consisting essentially of flour and an edible, chemically saturated monoglyceride composition at a concentration in a range from about 1 to about 3 percent by weight of said flour, said composition being derived from hydrogenated cottonseed oil and having a monoglycerides concentration of at least about 90 percent by weight.

6. A spaghetti product consisting essentially of flour and an edible, chemically saturated monoglyceride composition at a concentration of about 0.8 percent by weight of said flour, said composition being derived from hydrogenated cottonseed oil and having a monoglycerides concentration of at least about 90 percent by weight.

7. An alimentary paste product consisting essentially of alimentary paste flour which has been contacted with an edible, chemically saturated monoglyceride at a concentration of at least about 0.3 percent by weight of the flour content of said product.

8. An alimentary paste product consisting essentially of alimentary paste flour which has been contacted with an edible, chemically saturated monoglyceride composition at a concentration in a range from about 0.3 to about 2 percent by weight of said flour.

9. An alimentary paste product consisting essentially of alimentary paste flour which has been contacted with an edible, chemically saturated monoglyceride composition at a concentration in a range from about 0.5 to about 1.2 percent by weight of said flour.

10. In a process for preparing an alimentary paste product, the improvement which comprises incorporating into the alimentary paste an edible, chemically saturated monoglyceride at a concentration of at least about 0.3 percent by weight of the flour content of said product.

11. In a process for preparing an alimentary paste product, the improvement which comprises incorporating into the alimentary paste an edible, chemically saturated monoglyceride composition at a concentration in a range from about 0.3 to about 2 percent by weight of the flour content of said product.

12. In a process for preparing an alimentary paste product, the improvement which comprises incorporating into the alimentary paste an edible, chemically saturated monoglyceride composition at a concentration in a range from about 0.3 to about 2 percent by weight of the flour content of said product, at least about 90 percent by weight of said monoglyceride composition consisting of edible, chemically saturated monoglycerides in which the fatty acid moieties have from 8 to 22 carbon atoms.

13. In a process for preparing an alimentary paste product, the improvement which comprises incorporating into the alimentary paste an edible, chemically saturated monoglyceride composition at a concentration in a range from about 0.5 to about 1.2 percent by weight of the flour content of said product, at least about 90 percent by weight of said monoglyceride composition consisting of edible, chemically saturated monoglycerides in which the fatty acid moieties have from 14 to 20 carbon atoms.

14. In a process for preparing an alimentary paste product wherein water and alimentary paste flour are admixed to form a paste, the improvement which comprises incorporating into the alimentary paste an edible, chemically saturated monoglyceride composition at a concentration in a range from about 0.3 to about 2 percent by weight of the flour content of said product, at least about 90 percent by weight of said monoglyceride composition consisting of edible, chemically saturated monoglycerides in which the fatty acid moieties have from 8 to 22 carbon atoms by forming a water dispersion of said monoglyceride composition and adding said dispersion to said flour at the stage of admixing said flour and water.

15. In a process for preparing noodles by admixing alimentary paste flour and water to form a paste, pressing the paste into sheets; cutting and drying the ribbons, the improvement which comprises incorporating into the paste an edible, chemically saturated monoglyceride composition at a concentration in a range from about 1 to about 3 percent by weight of said flour, said composition being derived from hydrogenated cottonseed oil and having a monoglycerides concentration of at least about 90 percent by weight.

16. In a process for preparing noodles by admixing alimentary paste flour and water to form a paste, pressing the paste into sheets; cutting and drying the ribbons, the improvement which comprises incorporating into the paste an edible, chemically saturated monoglyceride composition at a concentration in a range from about 1 to about 3 percent by weight of said flour, said composition being derived from hydrogenated cottonseed oil and having a monoglycerides concentration of at least about 90 percent by weight, said incorporating step being performed by forming a water dispersion of said monoglyceride composition and adding said dispersion to said flour at the stage of admixing said flour and water.

17. In a process for preparing spaghetti by blending together alimentary paste flour and water to form a paste, extruding the paste into strands and cutting and drying the strands, the improvement which comprises incorporating into the paste an edible, chemically saturated monoglyceride composition at a concentration in a range from about 1 to about 3 percent by weight of said flour, said composition being derived from hydrogenated cottonseed oil and having a monoglyceride concentration of at least about 90 percent by weight.

18. In a process for preparing spaghetti by blending together alimentary paste flour and water to form a paste, extruding the paste into strands and cutting and drying the strands, the improvement which comprises incorporating into the paste an edible, chemically saturated monoglyceride composition at a concentration in a range from about 1 to about 3 percent by weight of said flour, said composition being derived from hydrogenated cottonseed oil and having a monoglyceride concentration of at least about 90 percent by weight, said incorporating step being performed by forming a water dispersion of said monoglyceride composition and adding said dispersion to said flour at the stage of blending together said flour and water.

References Cited in the file of this patent

Le Clerc: "Macaroni Products," Cereal Chemistry, September 1933, vol. X No. 5, pages 398–411. Copy in Scientific Library.

Cressey: "Glyceryl Monostearate in Food," Food Manufacture, April 1957, pp. 165–168. Copy in Scientific Library.